(12) United States Patent
Albrecht et al.

(10) Patent No.: US 8,978,502 B2
(45) Date of Patent: Mar. 17, 2015

(54) TRANSMISSION DRIVE UNIT

(75) Inventors: Susanne Albrecht, Forbach (DE); Frank Braunegger, Forbach Hundsbach (DE); Robert Heitz, Rastatt (DE); Peter Steuer, Karlsruhe (DE); Siegfried Reichmann, Rheinau Freistett (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 13/508,856

(22) PCT Filed: Sep. 21, 2010

(86) PCT No.: PCT/EP2010/063857
§ 371 (c)(1),
(2), (4) Date: Aug. 6, 2012

(87) PCT Pub. No.: WO2011/054585
PCT Pub. Date: May 12, 2011

(65) Prior Publication Data
US 2012/0308298 A1    Dec. 6, 2012

(30) Foreign Application Priority Data

Nov. 9, 2009   (DE) .......................... 10 2009 046 517

(51) Int. Cl.
*F16H 1/16*   (2006.01)
*F16H 1/20*   (2006.01)
*F16H 55/12*  (2006.01)
(Continued)

(52) U.S. Cl.
CPC .................. *F16H 55/06* (2013.01); *F16H 1/16* (2013.01); *F16H 55/22* (2013.01); *F16H 57/021* (2013.01); *F16H 2055/065* (2013.01)

USPC ............................................... 74/446; 74/425

(58) Field of Classification Search
CPC ..... Y10S 74/10; F16H 2055/065; F16H 1/16; F16H 2057/0213; F16H 55/06
USPC .................................... 74/446, 447, 451, 425
See application file for complete search history.

(56) References Cited

U.S. PATENT DOCUMENTS 4,548,592 A   10/1985   Ohhashi et al.
4,831,705 A   5/1989    Kanemitsu
(Continued)

FOREIGN PATENT DOCUMENTS

CN   201196248   2/2009
DE   3434093     3/1986
(Continued)

OTHER PUBLICATIONS

PCT/EP2010/063857 International Search Report dated Nov. 5, 2010 (Translation and Original, 6 pages).

*Primary Examiner* — Justin Krause
(74) *Attorney, Agent, or Firm* — Michael Best & Friedrich LLP

(57) ABSTRACT

The invention relates to a transmission drive unit (10; 40; 50; 70) having an adapter element made of plastic (22; 22*a*; 53; 73) via which a torque is initiated by an input element (29) and a drive element (12; 12*a*; 51; 72) made of metal for forwarding the torque, wherein the adapter element (22; 22*a*; 53; 73) and the drive element (12; 12*a*; 51; 72) are directly coupled to one another and rigidly connected, wherein the adapter element (22; 22*a*; 53; 73) is an injection molded part which is formed by at least partial overmolding of the drive element (12; 12*a*; 51; 72) and wherein the drive element (12; 12*a*; 51; 72) serves as a bearing element.

10 Claims, 6 Drawing Sheets

(51) Int. Cl.
  *F16H 55/06* (2006.01)
  *F16H 57/021* (2012.01)
  *F16H 55/22* (2006.01)

(56) References Cited

U.S. PATENT DOCUMENTS

| | | | |
|---|---|---|---|
| 5,040,430 A * | 8/1991 | Adam et al. | 74/425 |
| 6,140,578 A | 10/2000 | Ade et al. | |
| 6,497,041 B2 * | 12/2002 | Fujita et al. | 29/893.35 |
| 7,360,468 B2 * | 4/2008 | Yabe et al. | 74/446 |
| 8,646,352 B2 * | 2/2014 | Tanaka et al. | 74/446 |
| 2008/0022477 A1 * | 1/2008 | Ota | 15/250.34 |
| 2009/0056489 A1 | 3/2009 | Niederer et al. | |

FOREIGN PATENT DOCUMENTS

| | | |
|---|---|---|
| DE | 102004044863 | 3/2006 |
| EP | 2218944 | 8/2010 |
| JP | 57-7656 | 1/1982 |
| JP | 05-059034 | 8/1993 |
| JP | H10220560 | 8/1998 |
| JP | 2008-25643 | 2/2008 |

\* cited by examiner

TRANSMISSION DRIVE UNIT

BACKGROUND OF THE INVENTION

The invention relates to a transmission drive unit. The applicant's subsequent publication DE 10 2009 000 760 A1 discloses a transmission drive unit which has an output element which is produced from metal, in particular from sintered metal, and is at least partially insert molded by an adaptor element designed as a worm wheel. The adaptor element is accommodated within a transmission housing. The adaptor element is mounted rotatably on an axle stub of the housing base, wherein both the axle stub and the adaptor element are composed of plastic. The previously known transmission drive unit which is designed in particular as a sliding roof drive can be produced relatively inexpensively by the adaptor element being injection molded on. The wear resistance of the known transmission drive unit is worthy of improvement in particular under high loads. Furthermore, force is introduced by the adaptor element to the output element over a relatively small axial length, and therefore the driving torque which can be transmitted is restricted.

SUMMARY OF THE INVENTION

Proceeding from the prior art described, the invention is based on the object of developing a transmission drive unit in such a manner that it permits good bearing properties and the possibility of transmitting relatively high torques while being able to be produced economically. This object is achieved with a transmission drive unit according to the invention. The invention is based on the concept of using the output element at the same time as a bearing element in order to improve the bearing properties. Since the output element is composed of metal, there is therefore the possibility of designing a metal/plastics bearing which is distinguished by improved wear resistance in comparison to a plastics/plastics bearing.

Particularly high torques can be transmitted if the output element is designed so as to be extended into a plane of symmetry of the adaptor element. As a result, the torque is introduced by the adaptor element in the plane of the output element.

A cost-effective radial mounting of the output element can be brought about if the output element has at least one region into which a journal serving for the mounting projects.

In an alternative refinement of the invention, the transmission drive unit can be produced particularly cost-effectively, wherein at the same time relatively high torques can likewise be transmitted. In this case, the invention is based on the concept of enabling the output element to be produced particularly simply and inexpensively by means of an output element which can be connected to the adaptor element and is designed as a deep drawn part.

The manufacturing can be configured in a particularly simple manner in this case if the output element is pressed onto the adaptor element. The pressing-on therefore constitutes a single installation step which can be very simply integrated into the manufacturing process.

As an alternative, provision is made for the adaptor element to be formed by at least partial insert molding of the output element. Such a formation permits a particularly intimate connection between the adaptor element and the output element, thus enabling particularly high torques to be transmitted.

In order to permit the torques to be transmitted, provision is made, in an advantageous refinement of the invention, for the output element to be of cup- or sleeve-shaped design and to have, on the inner surface thereof, at least one molding which interacts with a mating molding molded onto the adaptor element and connects the output element to the adaptor element for conjoint rotation.

In this case, particularly simple installation is made possible in the event of pressing on if the at least one molding and the at least one mating molding are arranged obliquely in relation to the longitudinal axis of the output element.

Axial securing between the adaptor element and the output element, which securing is expedient in particular in the event of the output element being pressed onto the adaptor element, is made possible if the output element has, on an inner surface, at least one latching geometry which interacts with a mating geometry formed on the adaptor element and, in the process, axially secures the output element on the adaptor element.

A mounting which is particularly reliable and absorbs relatively high radial forces is brought about if the radial mounting of the unit consisting of the adaptor element and output element has two bearings having different diameters.

BRIEF DESCRIPTION OF THE DRAWINGS

Further advantages of the invention emerge from the description below of preferred exemplary embodiments and with reference to the drawings, in which.

Identical components and components of identical function are provided with the same reference number in the figures.

DETAILED DESCRIPTION

Figure 1:
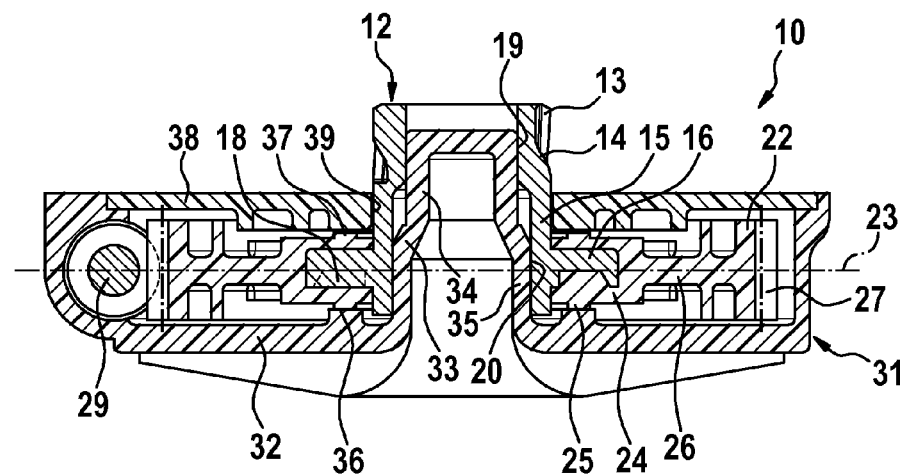
FIG. 1 shows a first transmission drive unit according to the invention in a longitudinal section.

FIG. 1 illustrates a first transmission drive unit 10, as provided in particular, but not restrictively, for use in a sliding roof drive of a motor vehicle. The transmission drive unit 10 has an output element which is composed of metal, in particular of sintered metal, and is designed as an output pinion 12. In this case, the output pinion 12 constitutes the intersection with a sliding roof system which is in engagement with a transmission means (not illustrated) via an oblique external toothing 13 formed on the output pinion 12. The adjustment of the roof mechanism is realized via the transmission means.

Figure 2:
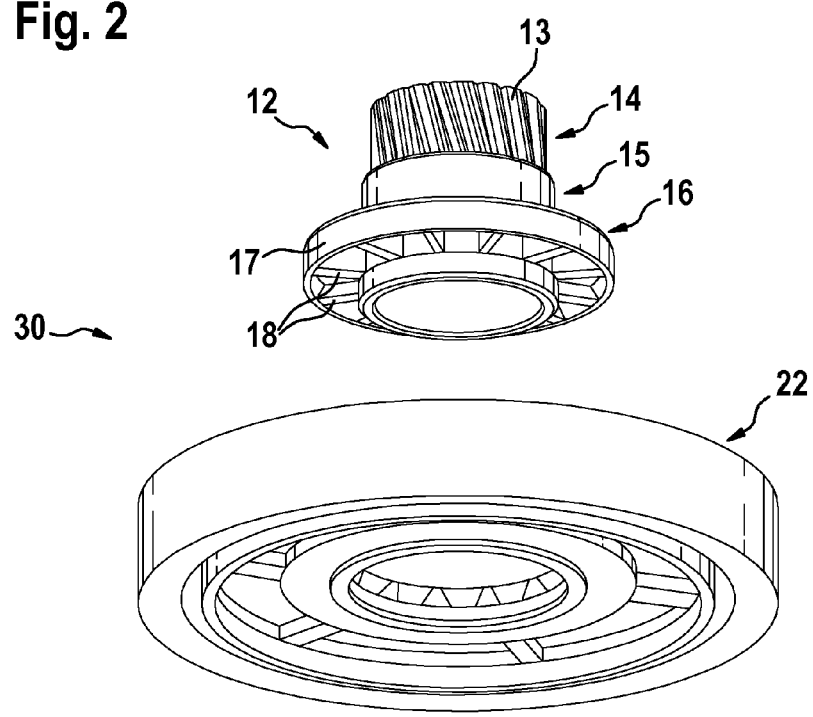
FIG. 2 shows an exploded illustration of an adaptor element and an output element, as used in the first transmission drive unit according to FIG. 1.

According to FIG. 2, the output pinion 12 has three sections 14 to 16. The external toothing 13 is formed on the first section 14. A second section 15, which is of substantially sleeve-shaped design, adjoins the first section 14. The second section 15 is surrounded approximately centrally by an annular third region 16 which has an encircling, web-like edge 17. Molded ribs 18 arranged in a radiated manner are integrally formed on the lower side or upper side (not illustrated) of the third section 15. As can be seen in particular from FIG. 1, the first section 14 has, on the inner wall thereof in the region of the external toothing 13, a first receiving region 19 which is adjoined in the region of the second section 15 on the inner wall by a second receiving region 20.

The output pinion 12 described to this extent is insert molded with an adaptor element which is composed of plastic and is designed as a worm wheel 22, and is connected to said adaptor element by a form-fitting connection. As can be seen in particular with reference to FIG. 1, the second section 15 of the output pinion 12 preferably occupies the entire height of the worm wheel 22, wherein the third annular section 16 of the output pinion 12 is located approximately in the plane of symmetry 23 of the worm wheel 22.

The form-fitting connection between the worm wheel 22 and the output pinion 12 is reinforced in particular by the encircling edge 17 and the molded ribs 18 of the output pinion 12, and therefore the output pinion 12 is connected to the worm wheel 22 for conjoint rotation. The worm wheel 22 has an inner region 24, on the lower side of which a bearing collar 25 is molded. The external toothing 27 is connected to the worm wheel 22 via an annular central region 26. The external toothing 27 of the worm wheel 22 is in engagement with an input element which is designed as a worm shaft 29 and forwards the driving torque of a driving motor (not illustrated) for the sliding roof drive to the worm wheel 22 and the output pinion 12.

The unit 30 which is described to this extent and consists of the output pinion 12 and the worm wheel 22 injection molded onto the output pinion 12 is arranged, with the exception of a region of the output pinion 12, within a transmission housing 31 composed of plastic. The transmission housing 31 comprises a housing lower part 32 which centrally has a molded-on bearing journal 33. The bearing journal 33 has two regions 34 and 35 which serve for the radial mounting of the worm wheel 22 in the transmission housing 31, for which purpose the first region 34 is in bearing contact with the first receiving region 19 of the output pinion 12 and the second region 35 is in bearing contact with the second receiving region 20 of the output pinion 12. The worm wheel 22 is axially mounted in the transmission housing 31 via an annularly encircling web 36 which is molded onto the base of the housing lower part 32 and interacts with the bearing collar 25 on the lower side of the worm wheel 22. A further, annularly encircling web 37 on the upper side of the worm wheel 22 is supported on a housing cover 38 which is connected to the housing lower part 32, for example, by means of a latching or adhesive connection. In this case, the housing cover 38 has a centrally arranged aperture 39 through which the output pinion 12 protrudes out of the transmission housing 31.

Figure 3:
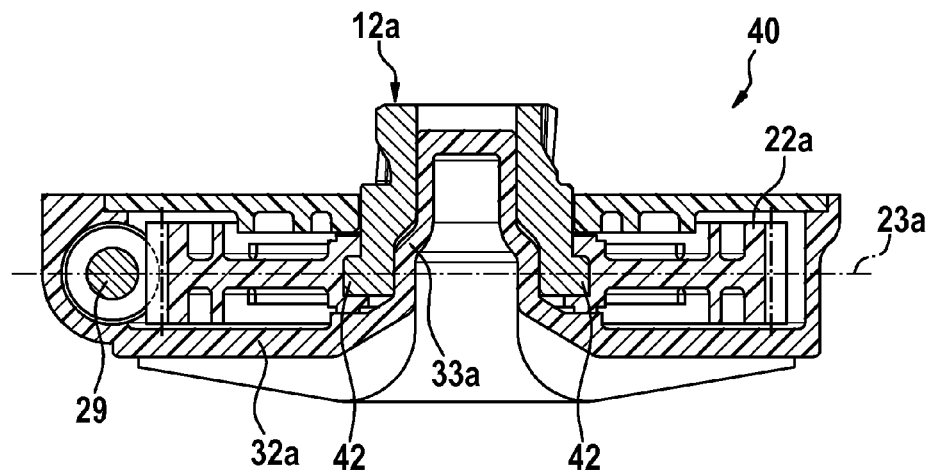
FIG. 3 shows a second transmission drive unit according to the invention in longitudinal section with an adaptor element which is changed in relation to FIG. 1.
Figure 4:
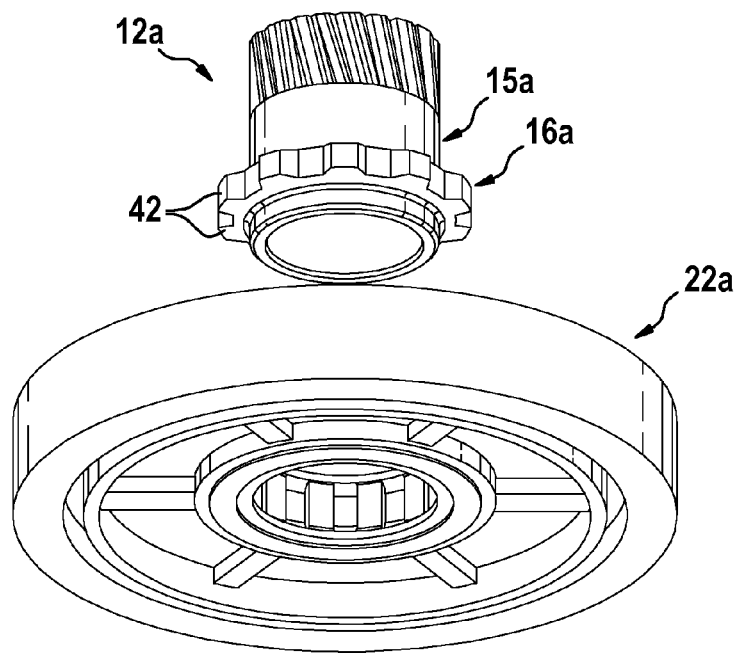
FIG. 4 shows an exploded illustration of the output element and adaptor element, as used in a transmission drive unit according to FIG. 3.

FIGS. 3 and 4 illustrate a second transmission drive unit 40 according to the invention. The second transmission drive unit 40 differs from the first transmission drive unit 10 substantially merely by the design of the output pinion 12a and of the worm wheel 22a. In this case, the output pinion 12a has, in the region of the second section 15a, a third section 16a which has gearwheel-like projections 42. The projections 42 are located, as can be seen in particular with reference to FIG. 3, likewise substantially level with the plane of symmetry 23a of the worm wheel 22a. The projections 42 serve to form a form-fitting connection between the output pinion 12a and the worm wheel 22a in order to increase the torques which can be transmitted. The output pinion 12a is mounted analogously to the mounting of the output pinion 12 via a metal/plastics pairing between the output pinion 12a and the bearing journal 33a of the housing lower part 32a.

Figure 5:
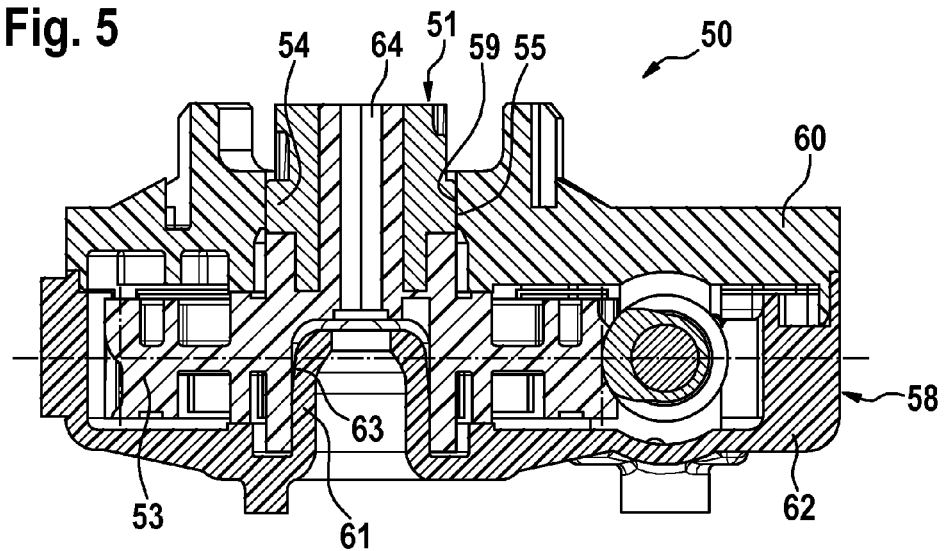
FIG. 5 shows a third transmission drive unit according to the invention in longitudinal section.
Figure 6:
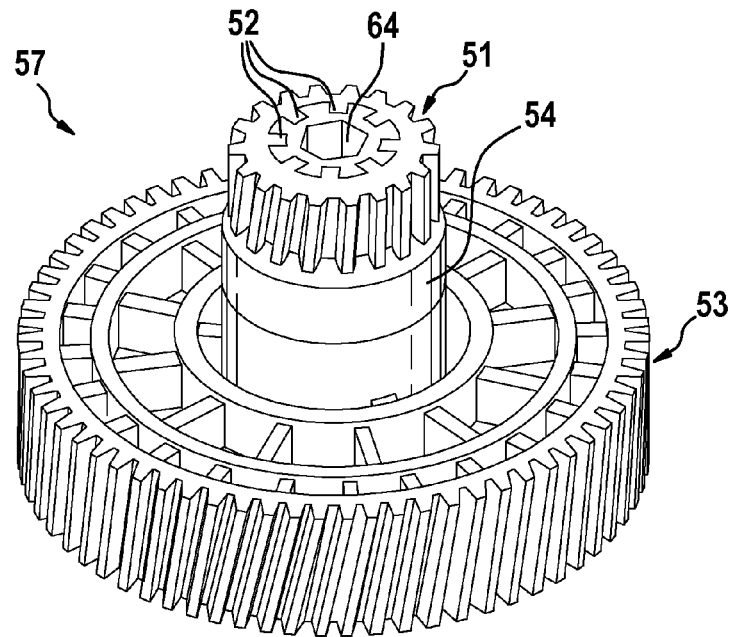
FIG. 6 shows a unit consisting of the output element and adaptor element, as used in the third transmission drive unit according to FIG. 5, in a perspective view.

FIGS. 5 and 6 illustrate a third transmission drive unit 50 according to the invention. The third transmission drive unit 50 comprises a sleeve-shaped output pinion 51 with an internal toothing 52 which serves for the form-fitting connection between the output pinion 51 and the worm wheel 53. Furthermore, a bearing collar 54 is formed in the central region of the output pinion 51, the outer wall 55 of which bearing collar serves as a first radial mounting of the output pinion 51 and of the unit 57, which consists of the output pinion 51 and worm wheel 53, in the transmission housing 58. The bearing collar 54 here interacts with a passage bore 59 in the housing cover 60 composed of plastic. A second radial mounting of the unit 57 is formed between the bearing journal 61 in the housing lower part 62 and a bore 63 formed in the worm wheel 53. In addition, a hexagon socket 64 which serves for the auxiliary actuation of the sliding roof drive, if the driving motor thereof should be defective, is also formed centrally in the output pinion 51. The third transmission drive unit 50 therefore has two radial bearings for the unit 57, the one bearing of which is designed as a metal/plastics pairing while the other bearing is designed as a plastics/plastics bearing.

Figure 7:
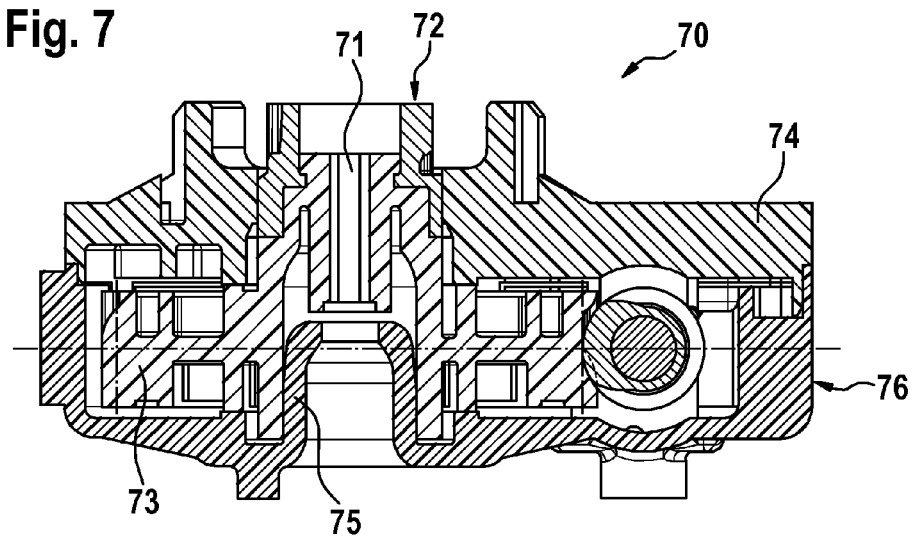
FIG. 7 shows a fourth transmission drive unit according to the invention in longitudinal section.
Figure 8:
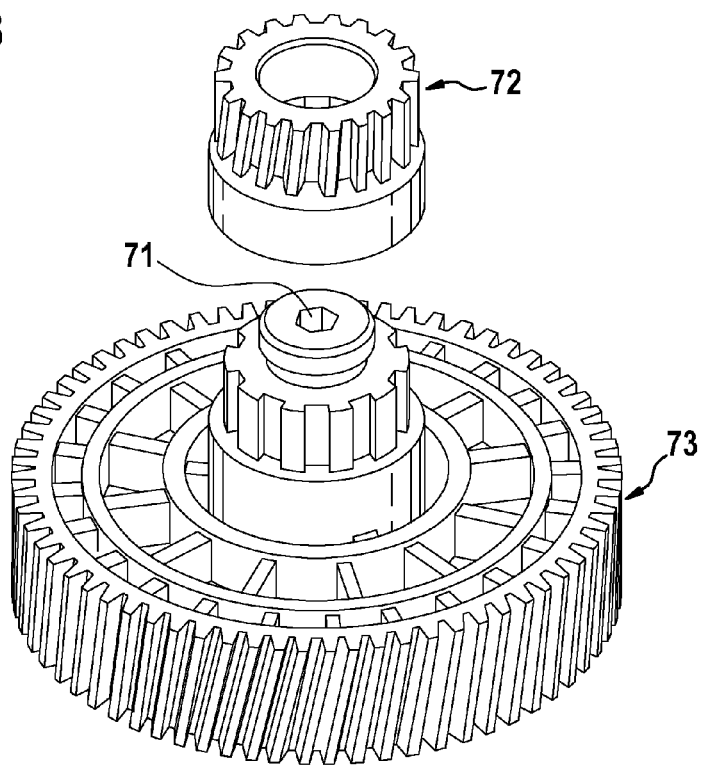
FIG. 8 shows an exploded illustration of an adaptor element and a drive element, as used in the transmission drive unit according to FIG. 7.

FIGS. 7 and 8 illustrate a fourth transmission drive unit 70 which differs from the third transmission drive unit 50 substantially only in that the auxiliary actuation for the sliding roof drive is formed by means of the hexagon socket 71 in the worm wheel 73 instead of in the output pinion 72. The fourth transmission drive unit 70 also has a first radial mounting of the output pinion 72 in the housing cover 74 while the worm wheel 73, which is composed of plastic, is mounted radially in the region of a bearing journal 75 of the housing lower part 76. The form-fitting connection between the output pinion 72 and the worm wheel 73 takes place in particular by means of web-like extensions formed on the inner wall of the output pinion 72 in the region of the first mounting.

Figure 9:
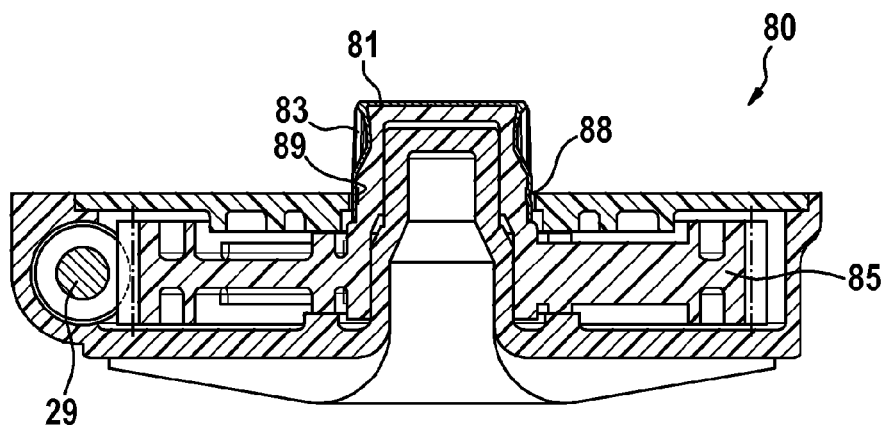
FIG. 9 shows a fifth transmission drive unit with a deep-drawn output element in longitudinal section.
Figure 10:
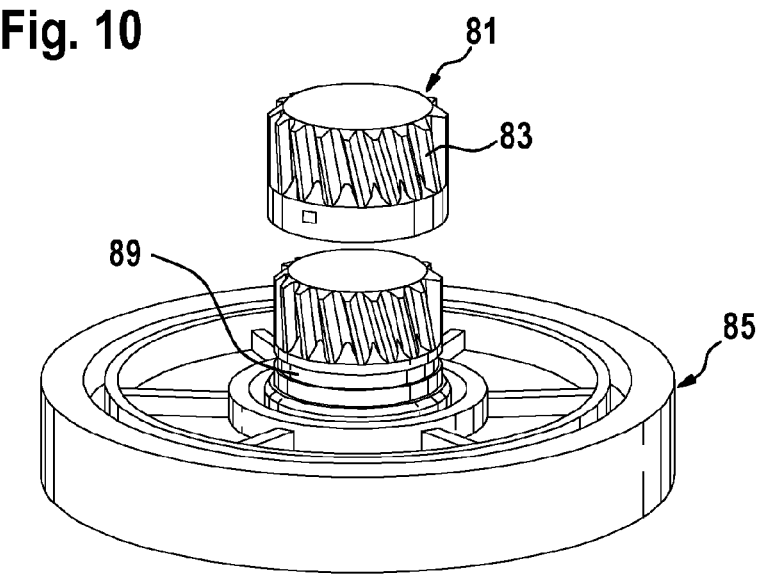
FIG. 10 shows an exploded illustration of an adaptor element and output element, as used in the transmission drive unit according to FIG. 9.
Figure 11:
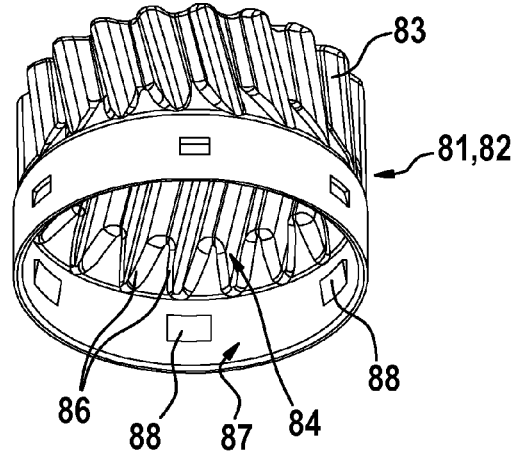
FIG. 11 shows a perspective view of an output element according to FIG. 10.

FIGS. 9 to 11 illustrate a fifth transmission drive unit 80 according to the invention. In the fifth transmission drive unit 80, the output pinion 81 thereof consists of a deep-drawn, cup-shaped sheet-metal part 82 which, in the region of the toothing 83 thereof, has radially inwardly projecting, obliquely arranged sections 84 which are formed by edges 86 on the side facing the worm wheel 85. Furthermore, latching sections 88 formed on the inner wall are seen on a lower, annularly encircling section 87 of the output pinion 81, which section faces the worm wheel 85. The latching sections 88 interact with a circumferential groove 89 formed on the worm wheel 85. The unit formed from the output pinion 81 and worm wheel 86 are manufactured in such a manner that the worm wheel 85 and the output pinion 81 are produced in separate processes. The output pinion 81 is subsequently pressed onto the worm wheel 85, wherein the latching sections 88 interact with the circumferential groove 89 in the end position of the output pinion 81 such that the output pinion 81 is secured axially on the worm wheel 85.

Figure 12:
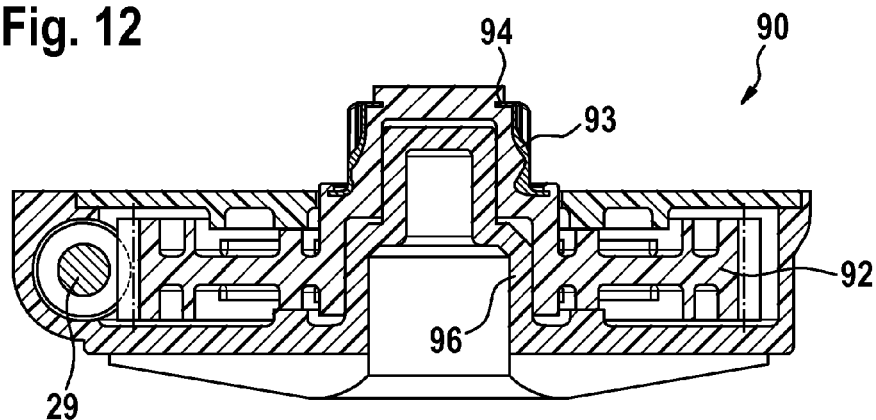
FIG. 12 shows a sixth transmission drive unit according to the invention, in which the adaptor element is formed by insert molding of a deep-drawn output element.
Figure 13:
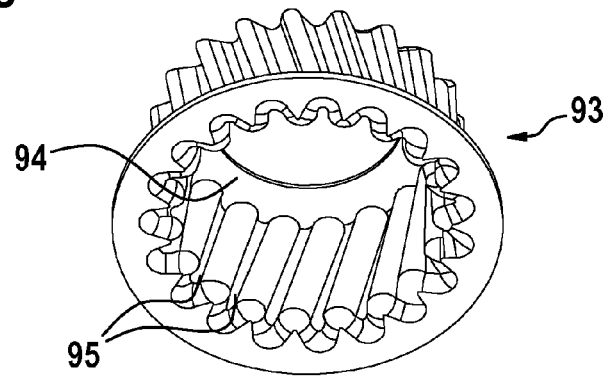
FIG. 13 shows a perspective view of an output element, as used in the transmission drive unit according to FIG. 12.

FIGS. 12 and 13 illustrate a sixth transmission drive unit 90 according to the invention. The sixth transmission drive unit 90 differs from the fifth transmission drive unit 80 essentially in that the worm wheel 92 of said sixth transmission drive unit is formed by insert molding of the output pinion 93 which is likewise designed as a deep-drawn part. In this case, the output pinion 93 according to FIG. 13 has, on the side facing the worm wheel 92, an annularly encircling collar 94 which, after said output pinion is insert molded by the plastic of the worm wheel 92, fixes the output pinion 93 axially in the worm wheel 92. Obliquely arranged depressions 95 which are formed on the inner wall of the output pinion 93 and, after having been injection molded from plastic, ensure that the output pinion 93 and the worm wheel 92 are secure against twisting, are likewise seen. The worm wheel 92 is mounted radially and axially likewise on two different diameters of a bearing journal 96.

What is claimed is:

1. A transmission drive unit (10; 40; 50; 70) comprising an adaptor element (22; 22a; 53; 73) which is composed of plastic and via which a torque is introduced by an input element (29), and an output element (12; 12a; 51; 72) which is composed of metal, wherein the adaptor element (22; 22a; 53; 73) and the output element (12; 12a; 51; 72) are coupled directly to each other and are rigidly connected, wherein the adaptor element (22; 22a; 53; 73) is an injection molded part which is formed by at least partial insert molding of the output element (12; 12a; 51; 72), wherein the output element (12; 12a; 51; 72) serves as a bearing element, wherein the adaptor element (22) is a worm wheel, wherein the output element (12) is in the form of a drive output pinion with an external metal toothing (13), wherein a unit consisting of the output pinion and worm wheel is arranged, with the exception of a region of the output pinion, within a transmission housing (31) made of plastic, the transmission housing (31) having a housing lower part (32) which centrally has a bearing journal (33) for the radial mounting of the worm wheel in the transmission housing (31), and wherein the output element (12) includes an inner wall that defines a central opening.

2. The transmission drive unit as claimed in claim 1, characterized in that the output element (12; 12a) is extended into a plane of symmetry (23; 23a) of the adaptor element (22; 22a).

3. The transmission drive unit as claimed in claim 1 wherein the adaptor element is molded onto the output element.

4. The transmission drive unit as claimed in claim 1, wherein the bearing journal (33) is received in the central opening.

5. The transmission drive unit as claimed in claim 1, wherein the bearing journal (33) is a molded-on component of the transmission housing (31), and the external toothing is made from sintered metal.

6. The transmission drive unit as claimed in claim 1, wherein the bearing journal (33) has a first region (34) and a second region (35) that serve for the radial mounting of the worm wheel in the transmission housing, wherein the first region (34) is in bearing contact with a first receiving region (19) of the output pinion (12) and the second region (35) is in bearing contact with a second receiving region (20) of the output pinion (12), and wherein the first region (34) has a different diameter than the second region (35).

7. The transmission drive unit as claimed in claim 1, wherein the worm wheel is axially mounted in the transmission housing (31) via an annularly encircling web (36) which is molded onto a base of the housing lower part (32) and contacts a bearing collar (25) on a lower side of the worm wheel.

8. The transmission drive unit as claimed in claim 7, wherein a further, annularly encircling web (37) on an upper side of the worm wheel is supported on a housing cover (38) that is coupled to the housing lower part (32).

9. The transmission drive unit as claimed in claim 8, wherein the housing cover (38) includes a centrally arranged aperture (39) through which the output pinion (12) protrudes out of the transmission housing (31).

10. The transmission drive unit as claimed in claim 1, wherein the central opening is a through opening.

* * * * *